United States Patent
Tu et al.

(10) Patent No.: US 11,897,295 B2
(45) Date of Patent: Feb. 13, 2024

(54) AXLE ASSEMBLY HAVING A TIRE INFLATION SYSTEM

(71) Applicant: CNH Industrial America LLC, New Holland, PA (US)

(72) Inventors: Jie Tu, Hinsdale, IL (US); Michael Jensen, Lockport, IL (US)

(73) Assignee: CNH Industrial America LLC, New Holland, PA (US)

(*) Notice: Subject to any disclaimer, the term of this patent is extended or adjusted under 35 U.S.C. 154(b) by 300 days.

(21) Appl. No.: 17/496,645

(22) Filed: Oct. 7, 2021

(65) Prior Publication Data
US 2022/0111687 A1    Apr. 14, 2022

Related U.S. Application Data

(60) Provisional application No. 63/089,785, filed on Oct. 9, 2020.

(51) Int. Cl.
*B60C 23/00* (2006.01)
*B62D 7/18* (2006.01)

(52) U.S. Cl.
CPC .. *B60C 23/00336* (2020.05); *B60C 23/00345* (2020.05); *B62D 7/18* (2013.01)

(58) Field of Classification Search
CPC ... B62D 7/18; B60C 23/003; B60C 23/00336; B60C 23/00345
See application file for complete search history.

(56) References Cited

U.S. PATENT DOCUMENTS

| | | | | |
|---|---|---|---|---|
| 2,107,405 | A * | 2/1938 | Williams | B60C 23/00318 |
| | | | | 152/417 |
| 6,325,123 | B1 | 12/2001 | Gao et al. | |
| 8,327,895 | B2 * | 12/2012 | Stech | B60C 23/00354 |
| | | | | 301/124.1 |
| 8,505,600 | B2 * | 8/2013 | Padula | B60C 23/00345 |
| | | | | 152/417 |
| 9,481,213 | B2 * | 11/2016 | Keeney | B60C 23/00345 |
| 10,807,413 | B2 * | 10/2020 | Balistreri | B60C 23/00372 |
| 11,179,976 | B2 * | 11/2021 | Patel | B60C 23/00336 |
| 11,376,898 | B1 * | 7/2022 | Begley | B60C 23/00336 |
| 11,571,935 | B2 * | 2/2023 | Finkle | B60C 23/00345 |

(Continued)

FOREIGN PATENT DOCUMENTS

| | | |
|---|---|---|
| CN | 204432764 | 7/2015 |
| CN | 107226131 | 10/2017 |

(Continued)

*Primary Examiner* — Paul N Dickson
*Assistant Examiner* — Maxwell L Meshaka
(74) *Attorney, Agent, or Firm* — Rickard K. DeMille; Rebecca L. Henkel

(57) ABSTRACT

An axle assembly includes a connection assembly having a stationary portion and a rotary portion. The stationary portion is configured to couple to an inlet airflow assembly configured to be non-movably coupled to a beam housing, the rotary portion is configured to couple to an outlet airflow assembly configured to be non-movably coupled to a steering knuckle, the stationary portion forms a cavity configured to facilitate flow of pressurized air from the inlet airflow assembly to the rotary portion, and the rotary portion forms an airflow path configured to facilitate flow of the pressurized air from the cavity to the outlet airflow assembly.

20 Claims, 6 Drawing Sheets

(56) References Cited

U.S. PATENT DOCUMENTS

| | | | | |
|---|---|---|---|---|
| 11,602,966 | B2* | 3/2023 | Yi | B60G 3/01 |
| 2009/0283190 | A1* | 11/2009 | Padula | B60C 23/00363 |
| | | | | 152/417 |
| 2011/0180192 | A1* | 7/2011 | Stech | B60C 23/00336 |
| | | | | 152/417 |
| 2015/0367690 | A1* | 12/2015 | Keeney | B60C 23/00363 |
| | | | | 152/417 |
| 2018/0215201 | A1* | 8/2018 | Balistreri | B60C 23/00381 |
| 2020/0346499 | A1* | 11/2020 | Tritschler | B60B 27/0047 |
| 2020/0361252 | A1* | 11/2020 | Patel | B60C 23/00336 |
| 2021/0031571 | A1* | 2/2021 | Pfeiffer | B60C 23/00309 |
| 2021/0101420 | A1* | 4/2021 | Finkle | B60C 23/003 |
| 2021/0323362 | A1* | 10/2021 | Jackson | B60C 23/00345 |
| 2022/0001710 | A1* | 1/2022 | Yi | B60G 3/26 |
| 2022/0111687 | A1* | 4/2022 | Tu | B62D 7/18 |
| 2023/0023313 | A1* | 1/2023 | Spindler | B60C 23/00363 |
| 2023/0091982 | A1* | 3/2023 | Capelli | B60C 23/0494 |
| | | | | 73/146.8 |
| 2023/0092710 | A1* | 3/2023 | Dunst | B60C 23/00354 |
| | | | | 152/416 |
| 2023/0219380 | A1* | 7/2023 | Coombs | B60C 23/00318 |
| | | | | 137/231 |

FOREIGN PATENT DOCUMENTS

| | | | | |
|---|---|---|---|---|
| DE | 102017127432 A1 | * | 5/2019 | |
| DE | 102018101411 A1 | * | 7/2019 | |
| FR | 2667826 A1 | * | 4/1992 | B60C 23/003 |
| GB | 2540423 A | * | 1/2017 | B60C 23/001 |
| WO | WO-2022130423 A1 | * | 6/2022 | |
| WO | WO-2023039629 A1 | * | 3/2023 | |

\* cited by examiner

AXLE ASSEMBLY HAVING A TIRE INFLATION SYSTEM

CROSS REFERENCE TO RELATED APPLICATION

This application claims priority from and the benefit of U.S. Provisional Application Ser. No. 63/089,785, entitled "AXLE ASSEMBLY HAVING A TIRE INFLATION SYSTEM," filed Oct. 9, 2020, which is hereby incorporated by reference in its entirety.

BACKGROUND

The disclosure relates generally to a tire inflation system for a work vehicle. More specifically, the disclosure is directed to a tire inflation system associated with an axle assembly.

Work vehicles (e.g., tractors, harvesters, sprayers, etc.) may include a tire inflation system configured to selectively inflate and deflate the tire(s) of the work vehicle. The tire inflation system typically includes a flexible air hose extending along an axle beam housing to a steering knuckle. Internal fluid passages extending through the steering knuckle and a wheel hub rotatably coupled to the steering knuckle facilitate airflow from the flexible air hose to the respective tire. The flexibility of the air hose enables the steering knuckle to rotate relative to the axle beam housing. Unfortunately, as the area between the axle beam housing and the wheel hub becomes more crowded with various components, routing of the flexible air hose may become increasingly difficult.

BRIEF DESCRIPTION

A steering knuckle including an airflow assembly, where the airflow assembly further includes an inlet airflow passage, an outlet airflow passage, and a connection union. The outlet airflow passage rotates around a steering axis of the steering kingpin. The connection union conveys airflow from the inlet airflow passage to the outlet airflow passage.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
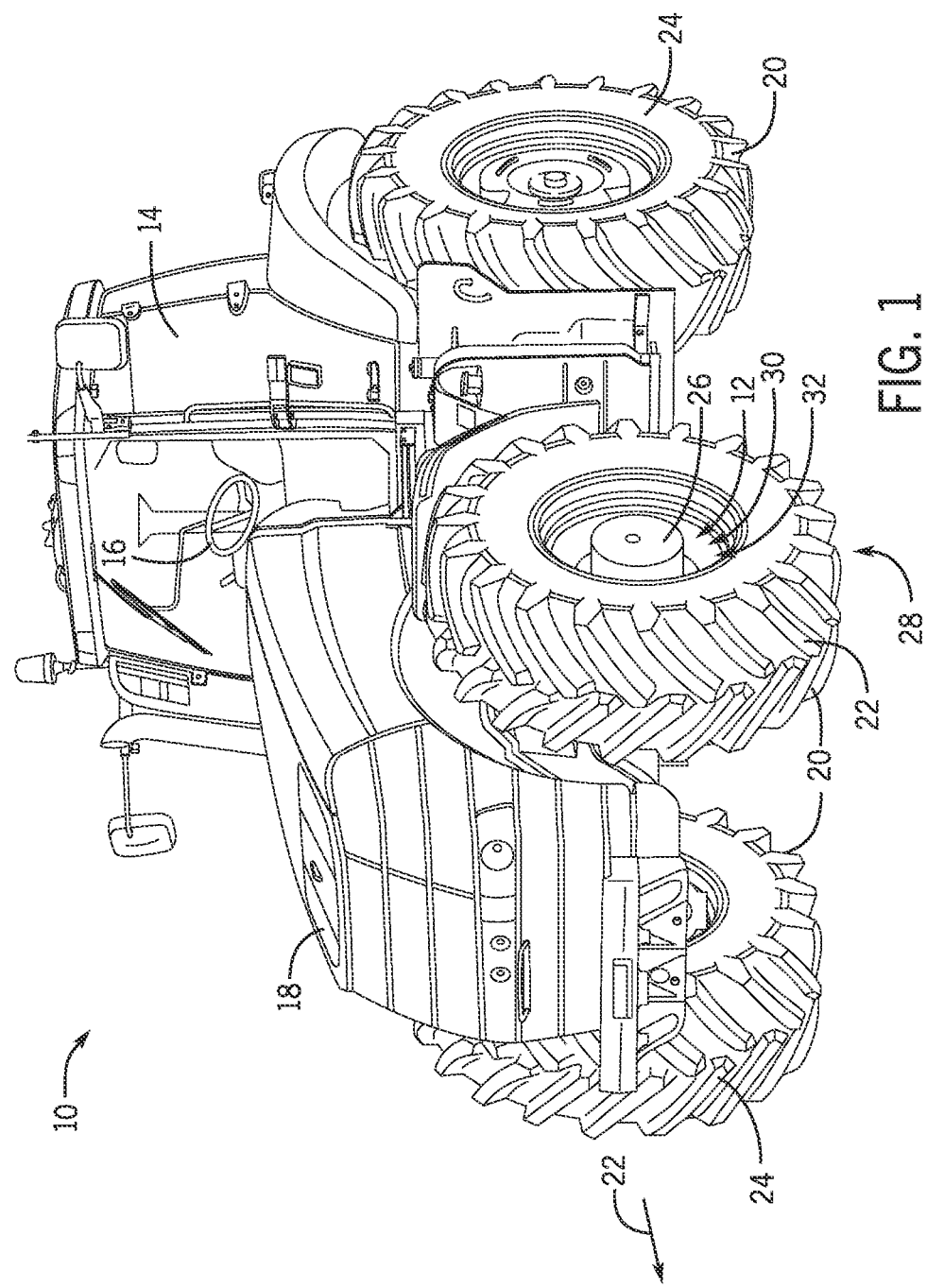
FIG. 1 is a perspective view of an embodiment of a work vehicle that includes an axle assembly.

FIG. 1 is a perspective view of an embodiment of a work vehicle 10 that includes an axle assembly 12. In the illustrated embodiment, the work vehicle 10 includes a cab 14 configured to house an operator. A steering wheel 16 is disposed within the cab 14 to facilitate control of the work vehicle 10. The cab may also house additional controls to enable the operator to control various functions of the work vehicle (e.g., movement of a tool coupled to the work vehicle, speed of the work vehicle, etc.).

In the illustrated embodiment, the work vehicle 10 includes a body 18 configured to house an engine, a transmission, other systems of the work vehicle 10, or a combination thereof. In addition, the work vehicle 10 includes wheels 20 configured to be driven by the engine, thereby driving the work vehicle 10 along a field, a road, or any other suitable surface in a direction of travel 22. Each wheel 20 includes a respective tire 24, and each wheel 20 is coupled to a respective wheel hub 26. The work vehicle 10 may also include a steering system 28. The steering system 28 may drive the wheel hubs 26/wheels 20 to pivot, thereby changing the direction of motion of the work vehicle 10. While the work vehicle 10 is a tractor in the illustrated embodiment, in other embodiments, the work vehicle may be a harvester, a sprayer, or any other suitable type of work vehicle.

The axle assembly 12 may include axles coupled to a differential and configured to drive the respective wheel hubs 26 to rotate. A drive shaft of the work vehicle may drive the axles to rotate via the differential. As discussed in detail below, the axle assembly 12 includes a beam housing that houses the axles. In certain embodiments, each wheel hub 26 may be rotatably coupled to a respective steering knuckle 30, which is pivotally coupled to the beam housing by respective steering kingpin(s) 32.

The work vehicle 10 may include a tire inflation system configured to selectively inflate and deflate one or more of the tires 24 and maintain a desired pressure in the respective tire(s) 24. The tire inflation system may include a rotary connection assembly to establish an airflow path between the beam housing and a respective tire 24. The rotary connection assembly may include stationary and rotary portions to establish the airflow path. The rotary connection assembly of the tire inflation system may obviate a flexible air hose for routing air to a rotary portion of the axle assembly 12, including the wheel hub 26 and the steering kingpin 32. For example, the rotary connection assembly may enable inflation and deflation of the respective tire 24 without regard to available space between the axle beam and wheel hub 26, or rotation of the wheel hub 26.

The rotary connection assembly is formed between a rotary union and the beam housing, as described with respect to FIGS. 2-6. The rotary connection assembly establishes a portion of an airflow path between the beam housing and the tire 24. The rotary connection assembly of the tire inflation system is configured to facilitate airflow between the beam housing and the steering knuckle 30 via an airflow path extending around the steering kingpin 32, thereby obviating an external flexible hose.

Figure 2:
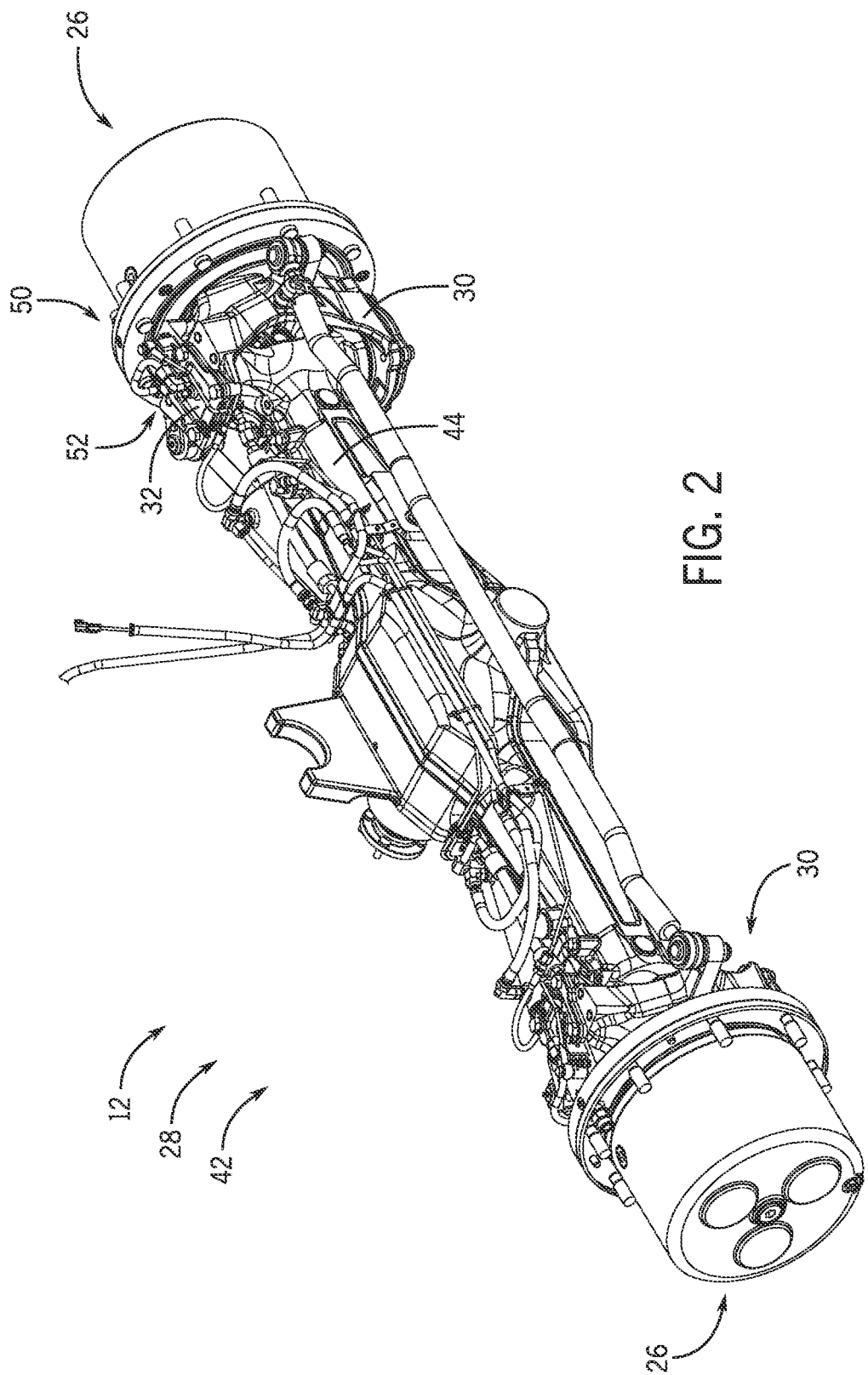
FIG. 2 is a perspective view of an embodiment of an axle assembly that may be employed within the work vehicle of FIG. 1.

FIG. 2 is a perspective view of an embodiment of the axle assembly 12 that may be employed within the work vehicle of FIG. 1. In the illustrated embodiment, the axle assembly 12 includes a steering knuckle 30 and a wheel hub 26 on each side of a beam housing 44. As previously discussed, each steering knuckle 30 is pivotally coupled to the beam housing 44, and each wheel hub 26 is rotatably coupled to a respective steering knuckle 30. In addition, the steering system 28 is configured to drive the steering knuckles 30 to pivot relative to the beam housing 44, thereby controlling the orientation of the wheels relative to the body of the work vehicle.

The axle assembly 12 also includes the tire inflation system 42 (e.g., a central tire inflation system (CTIS)) configured to substantially maintain a target tire air pressure within each tire by selectively inflating and, in certain embodiments, deflating the tire. A pressurized air source (e.g., disposed on the work vehicle or an implement attached to the work vehicle) may provide pressurized air to airflow assemblies that direct the pressurized air to the respective tires. The tire inflation system 42 may include multiple components to facilitate airflow to different sections of the axle assembly 12, as described in detail below. For example, the tire inflation system 42 may include a fixed airflow assembly, such as an airflow hose, coupled to a stationary portion of the axle assembly 12, such as the beam housing 44.

The fixed airflow assembly may be connected to the tires by the rotary connection assembly 52 extending between the stationary portion of the axle assembly 12 (e.g., the beam housing 44) and a rotary portion of the axle assembly 12 (e.g., the steering knuckle 30). For example, the fixed airflow assembly may include an air hose. The rotary connection assembly 52 may provide airflow between the stationary portion and the rotary portion of the axle assembly 12. That is, the rotary connection assembly 52 obviates a flexible air hose between the beam housing 44 and the knuckle 30. This may enable pressurized airflow to the respective tire without regard to available space for a flexible air hose, thereby enabling additional components to be positioned around the knuckle 30 without having to consider flexible air hose routing.

Each wheel hub 26 is rotatably coupled to a respective steering knuckle 30 (e.g., via a bearing assembly). One or more steering kingpins 32 pivotally couple each steering knuckle 30 to the beam housing 44, thereby enabling rotation of the steering knuckle 30 and the respective wheel hub 26 about a steering axis relative to the beam housing 44. As such, a rotary union 50, including a respective wheel hub 26 and a respective steering knuckle 30, facilitates steering of the work vehicle 10. Moreover, the rotary connection assembly 52 establishes an airflow path around the steering kingpin 32, thereby enabling pressurized air to flow between the beam housing 44 and the respective tire. The rotary union 50 is described in detail below.

Figure 3:
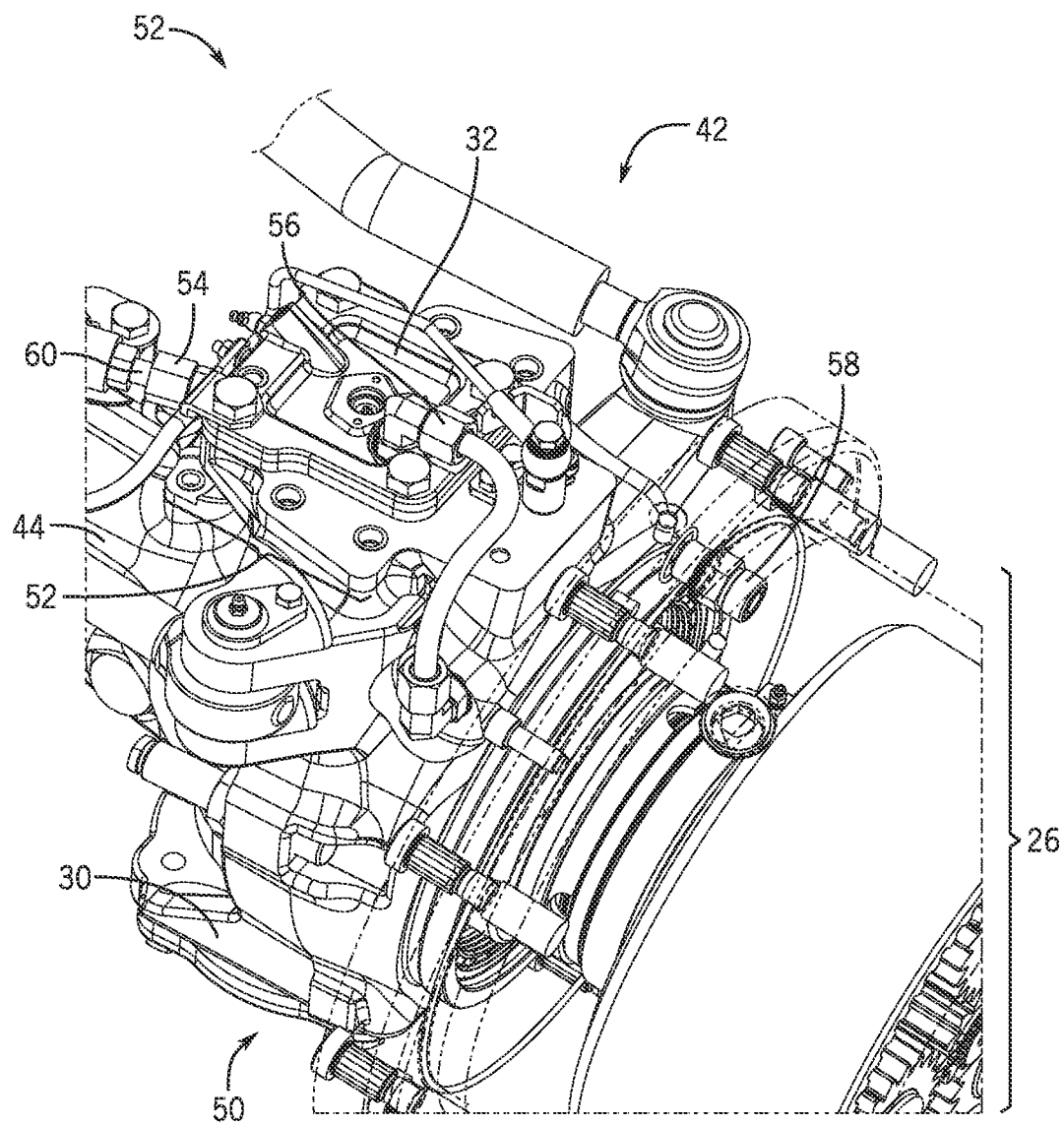
FIG. 3 is a perspective view of a rotary union of the axle assembly of FIG. 2.

FIG. 3 is a perspective view of a rotary union 50 of the axle assembly 12 of FIG. 2. The rotary union 50, which includes the wheel hub 26 and the steering knuckle 30, is coupled to the beam housing 44. As previously discussed, a steering kingpin 32 pivotally couples the steering knuckle 30 to the beam housing, thereby enabling rotation of the steering knuckle 30 and the wheel hub 26 about a steering axis relative to the beam housing. While a single steering kingpin 32 is shown on a top side of the beam housing, a second steering kingpin 32 may be positioned on a bottom side of the beam housing.

A rotary connection assembly 52 is formed within the rotary union 50/beam housing 44. The rotary connection assembly 52 establishes an airflow path around the steering knuckle 32, thereby enabling pressurized air to flow between the beam housing 44 and the tire. The rotary connection assembly 52 of the tire inflation system 42 is configured to facilitate airflow between the beam housing 44 and the steering knuckle 30 via an airflow path extending around the steering knuckle 32, thereby obviating an external flexible air hose. That is, the rotary connection assembly 52 may establish an airflow between the beam housing 44 and the tire 24 without regard to the available space on the rotary union 50.

In the illustrated embodiment, the rotary connection assembly 52 is disposed between an inlet airflow assembly 54 and an outlet airflow assembly 56. The inlet airflow assembly 54 is non-movably coupled to the beam housing and configured to receive air from the fixed airflow assembly. In addition, a stationary portion of the rotary connection assembly 52 is coupled to the inlet air flow assembly 54 and non-movably coupled to the beam housing 44. The outlet airflow assembly 56 is non-movably coupled to the steering kingpin 32/steering knuckle 30. The rotary connection assembly 52 is configured to direct the airflow from the inlet airflow assembly 54 to the outlet airflow assembly 56, thereby facilitating airflow to the outlet airflow assembly 56 throughout a pivoting range of motion of the steering knuckle 30. Fluid passages within the steering knuckle 30 and wheel hub 26 direct the airflow to a nozzle 58, which provides airflow to the respective tire as the tire/wheel rotates relative to the steering knuckle 30.

In the illustrated embodiment, a suitable airflow conduit, such as an air hose 60 (e.g., fixed airflow assembly), may form a portion of the inlet airflow assembly 54. For example, the air hose 60 may extend from a pressurized air source to a connector coupled to the stationary portion of the rotary connection assembly 52. The air hose 60 may be stationary relative to the beam housing 44 (e.g., coupled to the beam housing). The inlet airflow assembly 54 provides airflow to the rotary connection assembly 52 in the rotary union 50. In the illustrated embodiment, the inlet airflow assembly 54 is coupled to a first side of the rotary connection assembly 52. In some embodiments, the inlet airflow assembly 54 may be coupled to another suitable portion of the rotary connection assembly 52. The inlet airflow assembly 54 may be stationary relative to the beam housing 44. In other embodiments, an air path may be provided through the beam housing 44 using any viable airflow path to provide pressurized air to the rotary connection assembly 52. For example, the rotary connection assembly 52 may be integrated with the beam housing 44.

The rotary connection assembly 52 is disposed in the rotary union 50/beam housing 44. The rotary connection assembly 52 facilitates airflow between the inlet airflow assembly 54 and the outlet airflow assembly 56. The stationary portion of the rotary connection assembly 52 may include an annular structure non-movably coupled to the beam housing 44 and disposed around the steering kingpin 32. The rotary connection assembly 52 directs the airflow between the stationary inlet airflow assembly 54 to the rotary union 50 (e.g., the steering knuckle 30) regardless of the orientation of the rotary union 50 about the steering axis. Accordingly, the airflow path through the rotary connection assembly 52 may enhance the longevity of the tire inflation system (e.g., as compared to a tire inflation system including an airflow hose extending between the inlet airflow assembly and the outlet airflow assembly).

In the illustrated embodiment, the outlet airflow assembly 56 is coupled to the steering kingpin 32. However, in other embodiments, the outlet airflow assembly may be formed within a suitable component of the rotary union, such as the steering knuckle 30. The outlet airflow assembly 56 is configured to direct the airflow from the steering kingpin 32 to a flow passage extending through the steering knuckle 30. The flow passage through the steering knuckle 30 is fluidly coupled to a flow passage extending through the wheel hub 26, and the flow passage through the wheel hub 26 extends to the nozzle 58. Because the outlet airflow assembly 56 is coupled to the steering kingpin 32 and the steering knuckle 30, the outlet airflow assembly 56 rotates with the rotary union 50 relative to the beam housing 44. Furthermore, the nozzle 58 is disposed on the wheel hub 26 and configured to direct the airflow into the tire. The inlet airflow assembly 54, the rotary connection assembly 52, and the outlet airflow assembly 56 are described in more detail below.

Figure 4:
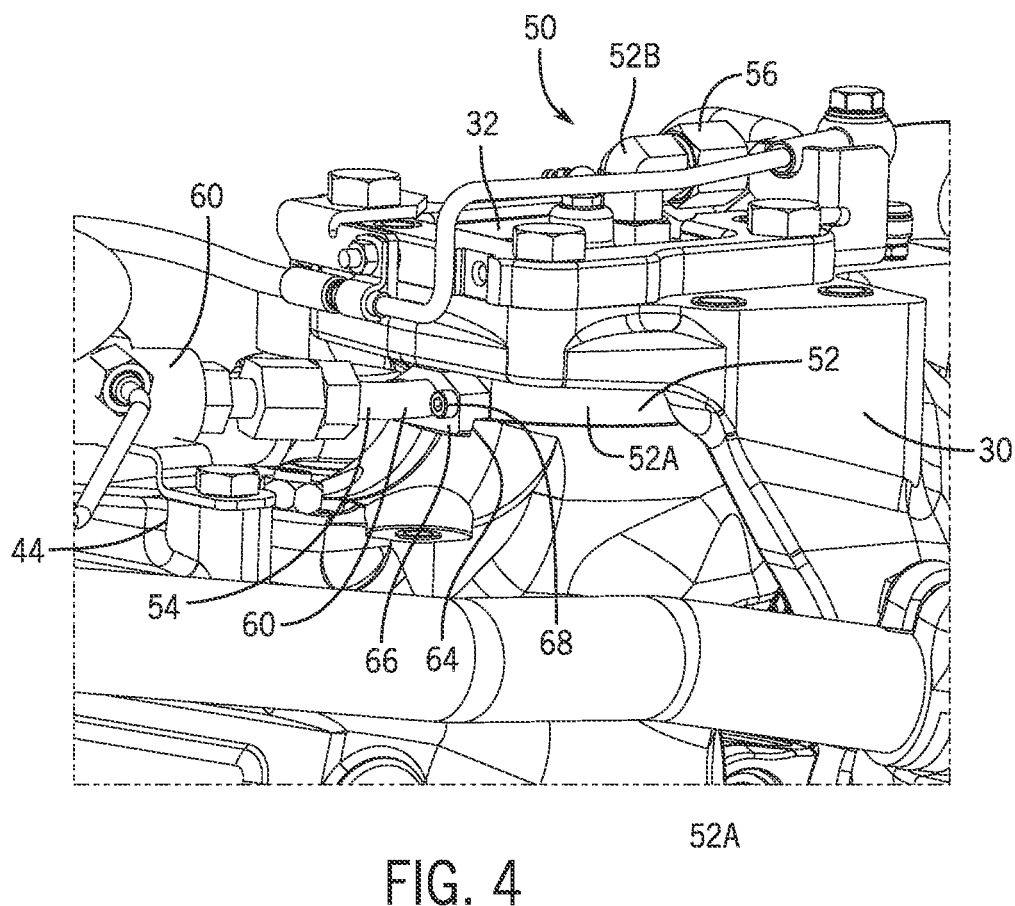
FIG. 4 is a perspective view of a rotary connection assembly of the axle assembly of FIG. 2.

FIG. 4 is a perspective view of the rotary connection assembly 52 of the axle assembly of FIG. 2. In the illustrated embodiment, the rotary connection assembly 52 is disposed within the rotary union 50/beam housing 44. As depicted in FIG. 4, the inlet airflow assembly 54 connects to an outer surface of the rotary connection assembly 52 and the outlet airflow assembly 56 connects to the steering kingpin 32.

The rotary connection assembly 52 has a stationary portion 52A. The stationary portion 52A of the rotary connection assembly 52 is stationary with respect to the beam housing 44. In addition, the rotary connection assembly 52 has a rotary portion 52B, which is connected to the outlet airflow assembly 56. The rotary portion 52B is rotatable with respect to the beam housing 44 (e.g., and stationary with respect to the rotary union 50). As previously discussed, the rotary connection assembly 52 is formed within the rotary union 50/beam housing 44.

As previously discussed, the rotary union 50 is pivotally coupled to the beam housing 44. In the illustrated embodiment, the beam housing 44 has a groove configured to receive the rotary connection assembly 52. In addition, the beam housing 44 has a recess 64 configured to receive a connector 66 of the inlet airflow assembly 54. Contact between the connector 66 of the inlet airflow assembly 54 and the material of the beam housing 44 forming the recess 64 blocks rotation of the stationary portion 52A of the rotary connection assembly 52 relative to the beam housing 44. Furthermore, the inlet airflow assembly 54 is connected to the stationary portion 52A of the rotary connection assembly 52. In the illustrated embodiment, the connector 66 of the inlet airflow assembly 54 is connected to the stationary portion 52A of the rotary connection assembly 52 by bolts 68. In other embodiments, there could be other suitable elements/devices configured to block rotation of the stationary portion of the rotary connection assembly 52 relative to the beam housing 44. For example, the recess 64 and the connector 66, and/or other viable components may block rotation of the stationary portion 52A in certain embodiments. The stationary portion 52A is described in detail below.

Figure 5:
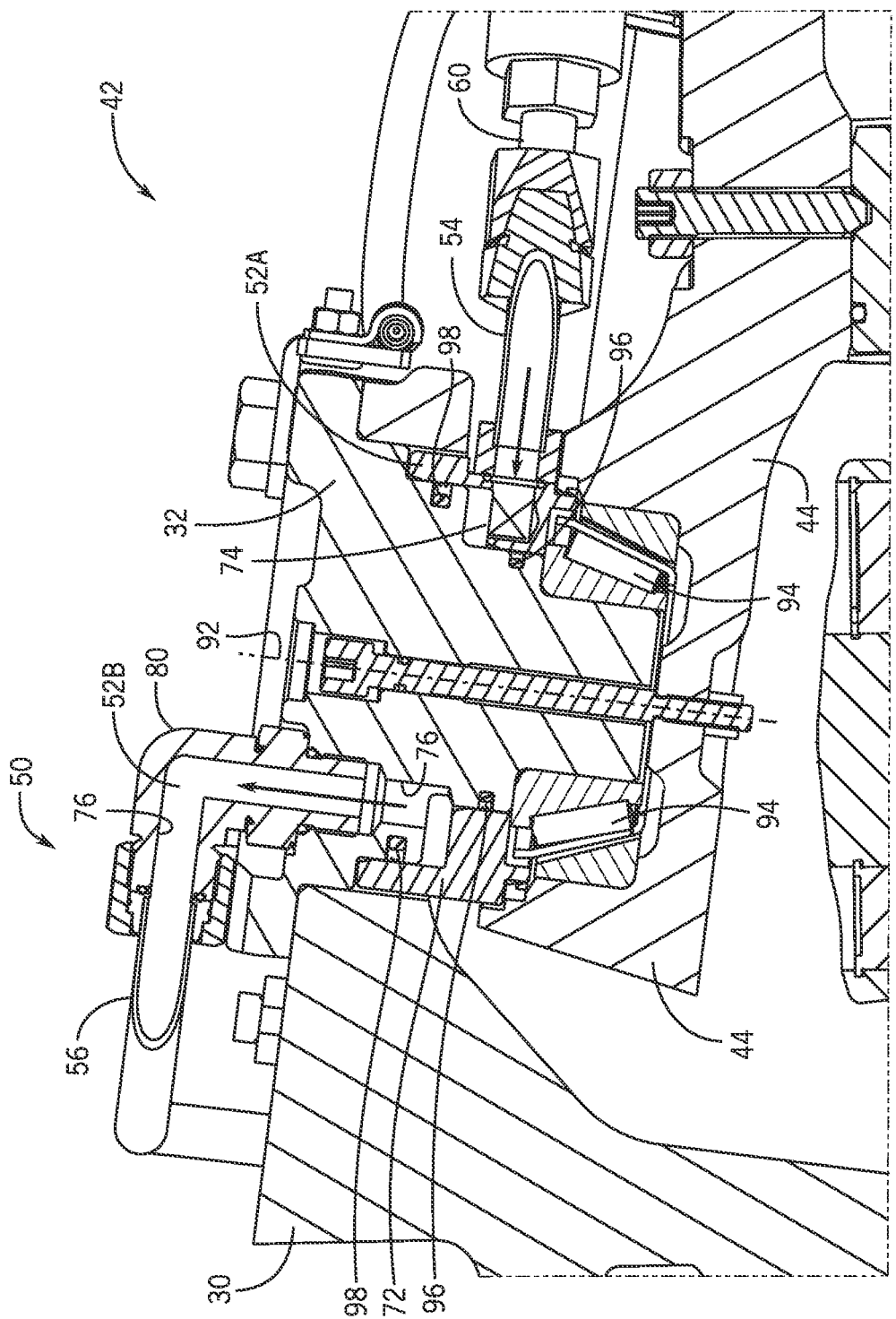
FIG. 5 is a cross-sectional view of the rotary union connected to the beam housing of the axle assembly of FIG. 2.

FIG. 5 is a cross-sectional view of the rotary union 50 connected to the beam housing 44 of the axle assembly of FIG. 2. As previously discussed, the rotary union 50 includes the knuckle 30 and the wheel hub. In addition, the rotary connection assembly 52 of the tire inflation system 42 is formed within the rotary union 50/beam housing 44.

The rotary union 50 may include various components in certain embodiments and may not be limited to the components in the illustrated embodiment of FIG. 5. For example, a top portion of the rotary union structure is shown in FIG. 5. In some embodiments, the bottom portion of the rotary union structure may substantially mirror the top portion (e.g., without the rotary connection assembly 52), whereas in other embodiments, the bottom portion of the rotary union structure may be different than the top portion.

The steering kingpin 32 facilitates the rotation of the rotary union 50 about a steering axis 92 relative to the beam housing 44. In certain embodiments, the steering axis 92 may be generally parallel to a vertical axis, whereas in other embodiments the steering axis may be oriented at another suitable angle for the specific application of the work vehicle. Furthermore, in certain embodiments, a steering sensor pin may extend through the steering kingpin 32 along the steering axis. The steering sensor pin may be configured to output a signal indicative of the angle of the steering knuckle 30 relative to the beam housing about the steering axis.

To facilitate airflow to the tire, the inlet airflow assembly 54 connects to the stationary portion 52A of the rotary connection assembly 52. The connection between the inlet airflow assembly 54 and the stationary portion 52A may block rotation of the stationary portion 52A relative to the beam assembly, as previously discussed with respect to FIG. 4.

The stationary portion 52A of the rotary connection assembly 52 includes a connection union 72 extending annularly about the steering kingpin 32. The connection union 72 is configured to establish a sealed airflow path with the rotary portion 52B (e.g., with the steering kingpin 32 of the rotary portion 52B), thereby enabling the pressurized air to flow from the inlet airflow assembly 54 to the outlet airflow assembly 56. The connection union 72 is described in more detail below.

As illustrated, an annular cavity 74 is formed between the connection union 72 and the steering kingpin 32 of the rotary portion 52B, thereby enabling air to flow around the steering kingpin 32 to an airflow passage 76 through the rotary portion 52B of the rotary connection assembly 52. In the illustrated embodiment, the airflow passage 76 extends from the annular cavity 74, through the steering kingpin 32, and through a connector 80 of the rotary portion 52B, which is connected to the outlet airflow assembly 56. In embodiments in which the outlet airflow assembly is formed within the steering knuckle, the connector of the rotary portion may be omitted. The annular cavity 74 facilitates sealed airflow through the rotary connection assembly 52. As previously discussed, the outlet airflow assembly 56 extends to a flow passage through the steering knuckle 30, and the flow passage through the steering knuckle 30 extends to a flow passage through the wheel hub, which extends to the nozzle, as described previously with respect to FIGS. 1-3.

In the illustrated embodiment, the cavity extending around the steering kingpin 32 is annular. In other embodiments, the cavity may have another suitable shape (e.g., arcuate) to enable the airflow through and/or around the steering kingpin 32. As such, the cavity around the steering kingpin 32 facilitates airflow between the inlet airflow assembly 54 and the outlet airflow assembly 56. Moreover, the steering kingpin 32 is configured to rotate relative to the beam housing 44 and the inlet airflow assembly 54. Hence, a sealed moving connection is formed between the stationary portion 52A and the steering kingpin 32 of the rotary portion 52B.

In the illustrated embodiment, the rotary portion 52B of the rotary connection assembly 52 includes the steering kingpin 32. A first portion of the airflow passage 76 extends from the annular cavity 74 through the steering kingpin 32, and a second portion of the airflow passage 76 extends through the connector 80. The connector 80 of the rotary portion 52B extends from the steering kingpin 32 to the outlet airflow assembly 56.

In the illustrated embodiment, the sealed moving connection includes a first air seal 96 and a second air seal 98. Each seal is disposed between the connection union 72 and the steering kingpin 32. The first air seal 96 and the second air seal 98 are configured to block air from flowing between the stationary portion 52A of the rotary connection assembly 52 and the steering kingpin 32. Accordingly, the air seals 96 and 98 may facilitate airflow through the annular cavity 74 from the inlet airflow assembly 54 toward the outlet airflow assembly 56. The air seals 96 and 98 may include/be formed using any suitable sealing material(s). For example, the air seals 96 and 98 may include grease to block air flow between the stationary portion 52A and the rotary portion 52B of the rotary connection assembly 52. While the described sealed moving connection includes two annular seals 96 and 98 in the illustrated embodiment, in other embodiments, the sealed moving connection may include more or fewer seals, and each seal may have any suitable shape/configuration suitable to block airflow between different components of the connection union 72 and the steering kingpin 32. Moreover, one or more air seals may be used between different components of the tire inflation system 42. For example, air seals may be used within certain component(s) of the rotary union 50.

Furthermore, in the illustrated embodiment, a kingpin bearing 94 is positioned between the steering kingpin 32 and the beam housing 44 to facilitate rotation of the steering kingpin 32 and the steering knuckle 30 relative to the beam housing 44. As illustrated, the kingpin bearing 94 extends annularly about a base of the steering kingpin 32 and enables rotation of the steering kingpin 32 about the steering axis 92. In the illustrated embodiment, the kingpin bearing 94 includes a single roller bearing. However, in other embodiments, the kingpin bearing may include any other suitable type of bearing (e.g., ball bearing, etc.) and/or multiple bearings (e.g., of the same type or of different types).

The tire inflation system 42 may inflate and, in certain embodiments, deflate the respective tire via the components described above. For example, the annular cavity 74 and the airflow passage 76 may facilitate airflow to inflate and deflate the respective tire. The tire inflation system 42, in the embodiment of FIG. 5, includes the air hose 60, the inlet airflow assembly 54, the rotary connection assembly 52, which includes the stationary portion 52A and the rotary portion 52B, and the outlet airflow assembly 56. The tire inflation system 42 is not limited to the depicted components of FIG. 5 and may include other and/or additional components and/or arrangement(s) of components in other embodiments with respect to different applications of the work vehicle.

The tire inflation system 42 may inflate the respective tire via the components shown in FIG. 5. The pressurized air from the air source may flow through the inlet airflow assembly 54 to the stationary portion 52A of the rotary connection assembly 52. The pressurized air may flow through the annular cavity 74, which is formed by the connection union 72, and around the steering kingpin 32 to the airflow passage 76 of the rotary portion 52B of the rotary connection assembly 52. The first air seal 96 and second air seal 98 may substantially block the flow of the pressurized air between the connection union 72 and the steering kingpin 32, thereby causing a substantial portion of the pressurized air to flow through the annular cavity 74 to the airflow passage 76 of the rotary portion 52B of the rotary connection assembly 52. The pressurized air may then flow to the outlet airflow assembly 56 and from the outlet airflow assembly 56 to the nozzle 58 (e.g., via the fluid passages within the steering knuckle 30 and the wheel hub 26).

In certain embodiments, the tire inflation system 42 may also deflate the respective tire via the components shown in FIG. 5. For example, the tire inflation system 42 may selectively facilitate airflow from the tire through the nozzle 58 to the outlet airflow assembly 56. The air may then flow from the outlet airflow assembly 56 to the airflow passage 76 of the rotary portion 52B of the rotary connection assembly 52. The air may then flow around the steering kingpin 32 via the annular cavity 74 to reach the inlet airflow assembly 54.

Figure 6:
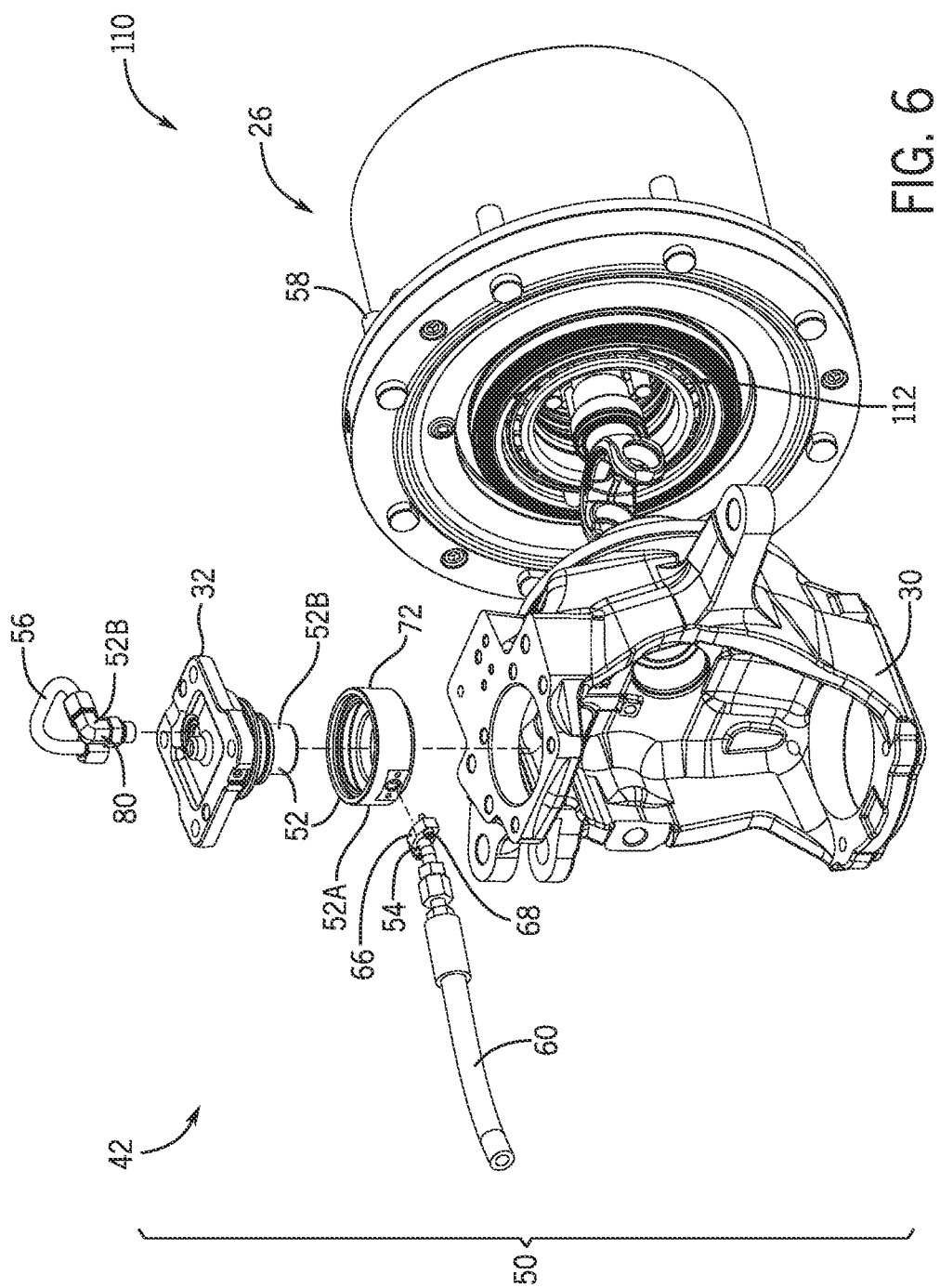
FIG. 6 is an exploded view of a wheel assembly of the work vehicle of FIG. 1.

FIG. 6 is an exploded view of a wheel assembly 110 of the work vehicle 10. The wheel assembly 110 includes the inlet airflow assembly 54, the rotary union 50, and the steering kingpin 32. A wheel hub bearing 112 facilitates rotation the wheel hub 26 relative to the steering knuckle 30. Accordingly, the wheel hub 26, as depicted in FIG. 6, may rotate, thereby facilitating rotation of the respective tire. As previously discussed, the connection union 72 is annular, thereby forming the annular cavity with the steering kingpin 32.

The stationary portion 52A of the rotary connection assembly 52 is stationary relative to the beam housing. The stationary portion 52A of the rotary connection assembly 52 is previously described with respect to FIG. 4. The steering knuckle 30 and other described components of the rotary union 50 are configured to rotate about the steering axis in response to actuation of the steering system 28. For example, the steering kingpin 32 may rotate inside the connection union 72.

In the illustrated embodiment, the steering kingpin 32 and the connection union 72 are engaged with the steering knuckle 30 during the operation of the wheel assembly 110. The rotary portion 52B of the rotary connection assembly 52 includes the steering kingpin 32 and the connector 80 in the illustrated embodiment. The rotary portion 52B of the rotary connection assembly 52 connects to the stationary portion 52A of the rotary connection assembly 52 and the outlet airflow assembly 56. Moreover, the outlet airflow assembly 56 facilitates airflow between the rotary portion 52B of the rotary connection assembly 52 and the nozzle 58, thereby facilitating inflation and/or deflation of the respective tire on the wheel hub 26. Furthermore, the rotary union 50, including the knuckle 30 and the wheel hub 26, may rotate about the steering axis 92.

To inflate the respective tire, pressurized air from an air source may flow through the air hose 60 of the inlet airflow assembly 54. The pressurized air may flow into the rotary connection assembly 52 through the inlet airflow assembly 54. As illustrated, bolts 68 couple the connector 66 of the inlet airflow assembly 54 to the connection union 72 of the stationary portion 52A of the rotary connection assembly 52, thereby establishing a substantially sealed connection between the inlet airflow assembly 54 and the connection union 72. In other embodiments, other connector(s) may be used to establish the sealed connection between the inlet airflow assembly 54 and the connection union 72.

The annular cavity formed by the connection union 72 enables pressurized air to flow around the steering kingpin 32 to the airflow passage of the rotary portion 52B of the rotary connection assembly 52. Accordingly, the pressurized air may flow from the inlet airflow assembly 54 and through the annular cavity, such that the pressurized air may flow to the airflow passage of the rotary portion 52B of the rotary connection assembly 52.

The airflow passage of the rotary portion 52B of the rotary connection assembly 52 extends through the steering kingpin 32. In addition, the rotary portion 52B of the rotary connection assembly 52 rotates around the steering axis 92. As previously discussed, the first air seal 96 and the second air seal 98 are disposed between the connection union 72 and the steering kingpin 32 to seal the annular cavity 74 during rotation of the steering kingpin 32. Furthermore, the airflow passage of the rotary portion 52B of the rotary connection assembly 52 extends between the annular cavity 74 and the outlet airflow assembly 56. The outlet airflow assembly 56 is fluidly connected to the nozzle 58 disposed on the wheel hub 26, and the air flow through the nozzle 58 may inflate the respective tire attached to the wheel hub 26.

Furthermore, the tire inflation system 42 may also deflate the respective tire in certain embodiments. The nozzle 58 may enable flow of air from the respective tire to the outlet airflow assembly 56. The outlet airflow assembly 56 may enable airflow between the nozzle 58 and the rotary portion 52B of the rotary connection assembly 52. Hence, the air may flow through the outlet airflow assembly 56 to the rotary connection assembly 52. The air may then flow through the rotary connection assembly 52. Within the rotary connection assembly 52, the air may flow through the annular cavity 74 around the steering kingpin 32 to the inlet airflow assembly 54 (e.g., the air may exit through the air hose 60). In certain embodiments, the annular cavity 74 may be formed using different structures that facilitate airflow between the inlet airflow assembly 54 and the outlet airflow assembly 56. For example, the connection union 72 may be integrally formed within the beam housing 44.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An axle assembly, comprising a connection assembly comprising a stationary portion and a rotary portion, the stationary portion is configured to couple to an inlet airflow assembly configured to be non-movably coupled to a beam housing, the rotary portion is configured to couple to an outlet airflow assembly configured to be non-movably coupled to a steering knuckle, the stationary portion forms a cavity configured to facilitate flow of pressurized air from the inlet airflow assembly to the rotary portion, and the rotary portion forms an airflow path configured to facilitate flow of the pressurized air from the cavity to the outlet airflow assembly.

2. The axle assembly of claim 1, wherein the rotary portion of the connection assembly comprises a connector configured to couple to the outlet airflow assembly.

3. The axle assembly of claim 1, wherein the stationary portion of the connection assembly comprises a connection union configured to be non-rotatably coupled to the beam housing, wherein the connection union is configured to form the cavity.

4. The axle assembly of claim 3, wherein the connection union is configured to couple to the inlet airflow assembly, and the inlet airflow assembly is configured to contact the beam housing to block rotation of the connection union about a steering axis.

5. The axle assembly of claim 3, wherein the connection union extends about a steering kingpin of the rotary portion, and the steering kingpin is configured to move rotatably via a steering kingpin bearing.

6. The axle assembly of claim 1, comprising a first air seal disposed between the stationary portion of the connection assembly and the rotary portion of the connection assembly.

7. The axle assembly of claim 6, comprising a second air seal disposed between the stationary portion of the connection assembly and the rotary portion of the connection assembly.

8. An axle assembly, comprising:
    an inlet airflow assembly configured to receive pressurized air from a pressurized air source, wherein the inlet airflow assembly is configured to be non-movably coupled to a beam housing of the axle assembly;
    an outlet airflow assembly configured to provide the pressurized air to a tire, wherein the outlet airflow assembly is configured to be non-movably coupled to a steering knuckle of the axle assembly; and
    a connection assembly comprising a stationary portion coupled to the inlet airflow assembly and a rotary portion coupled to the outlet airflow assembly, wherein the stationary portion forms a cavity configured to facilitate flow of the pressurized air from the inlet airflow assembly to the rotary portion, and the rotary portion forms an airflow path configured to facilitate flow of the pressurized air from the cavity to the outlet airflow assembly.

9. The axle assembly of claim 8, wherein the rotary portion of the connection assembly comprises a connector coupled to the outlet airflow assembly.

10. The axle assembly of claim 9, wherein the rotary portion of the connection assembly comprises a steering kingpin coupled to the connector.

11. The axle assembly of claim 8, wherein the stationary portion of the connection assembly comprises a connection union configured to be non-rotatably coupled to the beam housing, wherein the connection union is configured to form the cavity.

12. The axle assembly of claim 11, wherein the inlet airflow assembly is coupled to the connection union, and the inlet airflow assembly is configured to contact the beam housing to block rotation of the connection union about a steering axis.

13. The axle assembly of claim 11, wherein the connection union extends about a steering kingpin of the rotary portion, and the steering kingpin is configured to move rotatably via a steering kingpin bearing.

14. The axle assembly of claim 8, comprising a first air seal disposed between the stationary portion of the connection assembly and the rotary portion of the connection assembly.

15. The axle assembly of claim 14, comprising a second air seal disposed between the stationary portion of the connection assembly and the rotary portion of the connection assembly.

16. An axle assembly, comprising:
a beam housing;
a steering knuckle configured to pivot about a steering axis relative to the beam housing;
a steering kingpin configured to pivotally couple the steering knuckle to the beam housing;
an inlet airflow assembly non-movably coupled to the beam housing, wherein the inlet airflow assembly is configured to receive pressurized air from a pressurized air source;
an outlet airflow assembly non-movably coupled to the steering knuckle, wherein the outlet airflow assembly is configured to provide the pressurized air to a tire; and
a connection assembly comprising a stationary portion coupled to the inlet airflow assembly and a rotary portion coupled to the outlet airflow assembly, wherein the stationary portion forms a cavity configured to facilitate flow of the pressurized air from the inlet airflow assembly to the rotary portion, and the rotary portion forms an airflow path configured to facilitate flow of the pressurized air from the cavity to the outlet airflow assembly.

17. The axle assembly of claim 16, wherein the rotary portion of the connection assembly comprises a connector coupled to the outlet airflow assembly and to the steering kingpin.

18. The axle assembly of claim 16, wherein the stationary portion of the connection assembly comprises a connection union non-rotatably coupled to the beam housing, wherein the connection union is configured to form the cavity.

19. The axle assembly of claim 18, wherein the inlet airflow assembly is coupled to the connection union, and the inlet airflow assembly is configured to contact the beam housing to block rotation of the connection union about the steering axis.

20. The axle assembly of claim 18, wherein the connection union extends about the steering kingpin, and the steering kingpin is configured to move rotatably via a steering kingpin bearing.

* * * * *